United States Patent [19]

Myers

[11] Patent Number: 5,407,699

[45] Date of Patent: Apr. 18, 1995

[54] ELECTRICALLY CONDUCTIVE PYRROLE POLYMERS

[75] Inventor: Ronald E. Myers, Strongsville, Ohio

[73] Assignee: The B. F. Goodrich Company, Akron, Ohio

[21] Appl. No.: 215,700

[22] Filed: Jul. 5, 1988

Related U.S. Application Data

[63] Continuation-in-part of Ser. No. 761,711, Aug. 2, 1985, Pat. No. 4,764,573, which is a continuation-in-part of Ser. No. 618,701, Jun. 8, 1984, abandoned.

[51] Int. Cl.$^6$ ............................................. B05D 5/12
[52] U.S. Cl. ........................................ 427/121; 252/519; 427/342; 427/389.8; 427/389.9; 428/264; 428/268; 428/308.4; 526/90; 526/258; 528/423
[58] Field of Search ............... 252/500, 519; 427/121, 427/342, 389.8, 389.9; 428/265, 268, 264, 308.4; 526/90, 258; 528/423

[56] References Cited

U.S. PATENT DOCUMENTS

| | | | |
|---|---|---|---|
| 2,354,110 | 7/1944 | Ford et al. | 428/268 X |
| 3,715,233 | 2/1973 | Harrier | 427/389.8 |
| 4,214,031 | 7/1980 | Miyakawa et al. | 428/213 |
| 4,330,573 | 5/1982 | Kostandov et al. | 427/389.8 X |
| 4,401,545 | 8/1983 | Naarmann et al. | 204/72 |
| 4,468,291 | 8/1984 | Naarmann et al. | 204/72 |
| 4,617,225 | 10/1986 | Newman et al. | 428/264 |
| 4,697,000 | 9/1987 | Witucki et al. | 528/423 |
| 4,764,573 | 8/1988 | Myers | 526/90 |

OTHER PUBLICATIONS

"Pyrrola Blacks I" by Pietro Pratesi, Gass. Chim. Itas. 67, 188–199 (1937) (Chem. Abstr. vol. 31, 10–Organic Chemistry, 7055–58).

"Preparation and Study of the Exchange Properties and Conductivity in a Continuous Stream of the Oxidation Products of Pyrrole" by Hawtiera-Cristofini, Francois et al. C. R. Acad. Sci. Ser. C1973, 277 (24), 1323-6 (Chem Abstr. vol. 80, 35–Synthetic High Polymers, 12144h).

"Chemical Synthesis of Conducting Polypyrrole and Some Composites," by Vittoria Bocchi et al, J. Chem. Soc., Chem. Commun. 148 (1986).

"Some Properties of Polypyrrole-Paper Composites" by Robert J. Bjorklund et al Journal of Electronic Materials, vol 13, No. 1 (1984) pp. 211-230.

"Electrochemical Polymerization of Pyrrole on Polymer-Coated Electrodes" by O. Niwa and T. Tamamura, J. Chem. Soc., Chem. Commun., Jul. 1, 1984 issue pp. 817-818.

*Primary Examiner*—Michael Lusignan
*Attorney, Agent, or Firm*—Alfred D. Lobo; Nestor W. Shust

[57] ABSTRACT

A process is provided for forming an electrically conductive polymer of a pyrrole monomer, optionally substituted at the 3- and 4- positions. The process comprises dispersing a polymerization initiator selected from the group consisting of anhydrous halides of iron, cobalt or nickel (Group VIII metal) in an anhydrous liquid reaction medium and, adding essentially pure pyrrole monomer, or a solution of the monomer in the liquid at a temperature in the range from about −20° C. to below about the boiling point of the solution. The pyrrole polymer so formed is a Group VIII metal halide counterion, and a conductor having a conductivity in the range from about 1 to about 150 ohm$^{-1}$cm$^{-1}$ ("S/cm" for brevity), or a semiconductor having a conductivity in the range from about 10$^{-3}$ to about 1 S/cm, depending upon the particular structure of the monomer, the ratio of the initiator to pyrrole monomer, and the molecular weight of the polymer formed. Ratios greater than 4 generally yield conductors, while ratios in the range from about 0.25 to 4 yield semiconductors. Conductive polypyrrole having only a chloride or bromide counterion is formed in acetonitrile. The chemical process of this invention may be used to form the pyrrole polymer on a substrate such as paper by soaking it in liquid pyrrole, then dipping the pyrrole-impregnated paper into a solution of anhydrous ferric chloride in diethyl ether.

6 Claims, No Drawings

ELECTRICALLY CONDUCTIVE PYRROLE POLYMERS

CROSS REFERENCE TO RELATED APPLICATION

This is a continuation-in-part application of Ser. No. 761,711, filed Aug. 2, 1985, now U.S. Pat. No. 4,764,573, which in turn is a continuation-in-part of Ser. No. 618,701 filed Jun. 8, 1984, now abandoned.

BACKGROUND OF THE INVENTION

This invention relates to organic conductors and semiconductors which fall into the group of polymeric pyrrole conductors. As is well known, such conducting polymers defy conventional melt-processing, cannot be compacted, whether molded or extruded, in the usual ways, nor deposited as a continuous film from solution; and, they are far from stable in air even at ambient temperature conditions. A polymer which defies compaction into a shaped article, places severe limitations upon its use. Certain pyrrole polymers made by electrodeposition are found to be compactable (see copending U.S. patent application Ser. No. 486,161, filed Apr. 18, 1983), and to form self-supporting films, but this process is too slow for general commercial utility. The problem was to find a relatively fast non-electrochemical process which yielded a compactable conductor (the term "conductor" as used herein includes semiconductors) so that the polypyrroles formed might be more versatile in their applications.

By "semiconductors" I refer to polymers of pyrrole/-substituted pyrrole monomers which have relatively low conductivity in the range from about $10^{-3} \text{ohm}^{-1}\text{cm}^{-1}$ ("S/cm" for convenience to indicate reciprocal ohms/cm) to 1 S/cm, while "conductors" have a conductivity in the relatively high range of from 1 to about 150 S/cm.

Poly(2,5-pyrrole) (referred to herein as "PP" for brevity), in which the —NH— group links sequences of conjugated double bonds, is normally an insulator, that is, has a conductivity less than about $10^{-10}$ S/cm and is totally insoluble in known solvents. It is known however, that electrochemically polymerized PP has good conductivity, but coupled with its melt-processing-resistance and the poor integrity of PP film so formed, it was deemed more desirable to produce the PP with a chemical process. Others have also sought to do so. In particular, German (FDR) Offenlegungasehrift DE 3321281 A1 published Dec. 22, 1983 discloses a chemical process for producing a conductive paper by impregnating the paper with different concentrations of an aqueous ferric chloride solution which is acidified with HCl, then exposing the impregnated paper to pyrrole monomer, usually in the gaseous phase. Further details of this process are disclosed in an article titled "Some Properties of Polypyrrole-Paper Composites" by Bjorklund, R. B. and Lundstroem, I., *Journal of Electronic Materials*, Vol 13, No. 1, 1984.

As also stated in Bjorklund et al, they were aware that anhydrous $FeCl_3$ used as a dopant with poly-p-phenylene exists as an $FeCl_4(2-)$ complex in the polymer matrix, thus imparting conductivity to the polymer. Other polymers, for example polyacetylene impregnated with $FeCl_3$ or other oxidants such as $SbCl_5$, and, neutral polypyrrole which is exposed to $FeCl_3$ vapor or an anhydrous solution of the electrolyte, is also made conductive. But impregnating a preformed polymer with $FeCl_3$ to make it conductive does not suggest that one may use anhydrous $FeCl_3$ as an initiator to form the polymer from the pyrrole monomer, or that the $FeCl_3$ would generate a charged species in the polymer formed. As is well-known, poly-p-phenylene cannot be formed by initiation with $FeCl_3$ (see "Reaction of Ferric Chloride with Benzene", by P. Kovacic and C. Wu, *J. Polym. Sci.* Vol XLVII pg 45–54 at pg 45, first sentence of "Results", 1960), and the polymer is not conductive unless post-treated with $FeCl_3$.

The insulating character of PP produced by Naarman is attributable to the combination of $AlCl_3$ and $Cu^{+2}Cl_2$ as the initiator, further possibly to the low molar ratio of the initiator to the pyrrole in the reaction mixture.

With respect to polymers of 3- and/or 4- substituted pyrroles ("subs PP"), Bjorklund et al corroborate the generally well known fact that providing substituents on pyrrole does not improve the conductivity of the subs PP. Yet, with the process of my invention, the designated subs PP has relatively good conductivity.

As noted by Bjorklund et al, their precipitated PP was compactable under 10 ton pressure to form a wafer. PP precipitated in my polymerization reaction is compacted under far less pressure into a wafer which can be handled, but the wafer, unlike wafers or films produced from electrochemically produced PP, has essentially no tensile strength.

The conductive PP/subs PP of the prior art which polymers owe their conductivity to exposure to an electrolyte of a Group VIII metal, for example $FeCl_3$, whether by exposure to $FeCl_3$ vapor, or by impregnation with an anhydrous solution of electrolyte, derive their conductivity from a $FeCl(2-)$ counter ion in which the Fe (or other Group VIII metal) is always present. It was therefore surprising to find that excellent conductivity, as high as 150 S/cm, may be obtained with only Cl present as the counter ion, and without the presence of Fe.

Though it appeared that the type of initiator (electrolyte) would affect the electrical properties of the polymer, the possibility that the solvent might affect the charged species in the polymer was given little consideration. And the possibility that a single initiator could provide different charged species in the same polymer if it is formed under different conditions, was given even less consideration. Thus the formation of $PP/subs\ PP+Cl^{-1}$ by a direct, single-step chemical process was both significant and unique.

SUMMARY OF THE INVENTION

I have discovered that pyrrole, optionally substituted with a wide variety of substituents in the 3- and/or 4-positions, may be polymerized in a chemical, but non-electrochemical reaction, to form a finely divided poly(2,5-pyrrole) which is conductive, is compactable but has essentially no tensile strength; and is therefore preferably applied to an insulating substrate to enhance its conductivity into the range from about $10^{-3}$ to about 150 S/cm.

It is therefore a general object of this invention to provide a process for forming an electrically conductive PP/subs PP polymer comprising, (a) dispersing a finely divided anhydrous polymerization initiator selected from the group consisting of halides of a Group VIII metal selected from iron, cobalt and nickel in an anhydrous organic liquid reaction medium with which said initiator is unreactive, so as to form a dispersion of said initiator in said medium, and, (b) adding anhydrous essentially pure liquid pyrrole monomer, optionally in solution in said medium, to said dispersion at a temperature in the range from above the freezing point of said medium to below its boiling point, so as to form said polymer which contains an ion selected from the group consisting of a Group VIII metal, halogen, and combinations thereof as charged species, said monomer having the structure

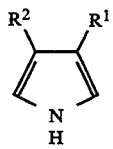

wherein, $R^1$ is selected from the group consisting of hydrogen, alkyl having from 1 to about 6 carbon atoms, cycloalkyl having from 3 to about 7 ring carbon atoms one or more of which may be subsituted, alkoxyalkyl having from 3 to about 24 carbon atoms, and benzyl which may optionally be ring-substituted with halogen or lower alkyl having from 1 to about 6 carbon atoms;

$R^2$ is selected from the group consisting of hydrogen hydroxyphenyl which may be ring-substituted, and an acyclic ether selected from the group consisting of (i) alkoxy represented by $-OR^3$, wherein $R^3$ represents alkyl having from 1 to about 12 carbon atoms, alkoxyalkyl having from 2 to about 24 carbon atoms, phenyl which may be substituted, benzyl or substituted benzyl, heteroaryl or substituted heteroaryl; (ii) polyalkoxy represented by the structure $CH_3 + OCH_2CH_2 \frac{1}{n'}$ wherein n' is an integer in the range from 1 to about 20; and (iii) $R^4-O-R^5$ wherein either $R^4$ or $R^5$ is a linking group selected from phenyl and benzyl, each of which may be substituted, alkyl having from 1 to about 24 carbon atoms, and cycloalkyl having from 3 to about 7 ring carbon atoms one or more of which may be substituted; and, $R^1$ may be substituted with $R^2$, and if so substituted, each $R^2$ substituent may be the same or different; whereby said pyrrole polymer formed has a conductivity in the range from about $10^{-3}$ to about 150 $ohm^{-1}cm^{-1}$ ("S/cm").

It is also a general object of this invention to convert an insulating susbtrate having a conductivity in the range from about $10^{-15}$ to $10^{-6}$ S/cm into a conductive substrate having a conductivity in the range from $10^{-3}$ to about 150 S/cm, by applying to the substrate a conductive deposit of finely divided particulate PP/subs PP formed by the process of my invention.

It is another general object of this invention to provide a conductive PP/subsPP which has only a Cl or Br counterion and essentially no Group VIII metal ion, simply by conducting the polymerization reaction in a coordinating solvent such as acetonitrile. A coordinating solvent is one which can form a covalent bond with the Group VIII metal. The polymer so formed, indicated by $PP/subsPP^+Cl^-$, or $PP/subsPP^+Br^-$, is compactable, has high conductivity, and excellent compatibility with a human body in which it may be implanted.

It is a specific object of this invention to provide a process in which the conductivity of a PP/subs PP, as a shaped article formed by compaction, or as a conductive deposit applied to a substrate, may be tailored to produce (i) a semiconductor ($10^{-3}$ to 1 S/cm) by maintaining a molar ratio of initiator to pyrrole monomer in the range of from about 0.1 to about 1, more preferably about 0.25 to 1; and (ii) a conductor (1 to 150 S/cm) by maintaining a molar ratio of initiator to pyrrole monomer in the range from 1 to about 20, more preferably 1 to about 10, in a saturated solution of initiator in liquid reaction medium.

It is another specific object of-this invention to provide a process in which one may produce a PP/subs PP conductor by maintaining the aforespecifed molar ratio in a dialkyl ether reaction medium in which $FeCl_3$ (anhyd) is soluble, as is the monomer, so that a maximum value of S/cm is reached within a relatively short time after commencement of the reaction, after which time, the value diminishes, which general relationship of S/cm as a function of time is a unique characteristic of PP/subs PP produced by my process.

It is also a specific object of this invention to provide a process for making conductive paper having a conductivity in the range from $10^{-3}$ to about 150 S/cm for use in EMI shielding, battery and photovoltaic applications, antistatic packaging, and, backing for dielectric paper, inter alia.

It is a further specific object of this invention to provide a synthetic resinous insulating substrate such as poly(vinyl chloride) with a conductive surface; and, insulating inorganic solid filler materials such as aluminum trihydrate, glass spheres or fibers and the like with a conductive coating.

DETAILED DESCRIPTION OF PREFERRED EMBODIMENTS

The conductive polymer of this invention may be represented by the structure:

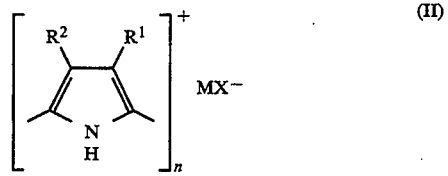

wherein, n is an integer in the range from 2 to about 100, and more preferably in the range from about 5 to about 20;

M represents a Group VIII metal selected from the group consisting of iron, nickel and cobalt;

X represents chorine or bromine;

$R^1$ and $R^2$ have the same connotation as that given hereinbefore.

In the process of this invention, a finely divided compactable PP/subs PP is precipitated from a liquid reaction medium in which the polymerization of a pyrrole/subs pyrrole monomer having the structure (I) is carried out under anhydrous conditions. By "liquid reaction medium" I refer to an organic liquid which is essentially unreactive with the polymerization initiator, or the monomer, unless the reaction medium is a coordinating solvent. For the anhydrous $FeCl_3$ Meek & Dragocoordination model, see "The Chemistry of Non-Aqueous Solvents" edited by J. J. Lagowski, Vol. I, Academic Press, New York (1966). By "anhydrous" conditions I refer to the reaction being carried out in the absence of moisture, particularly that the polymerization initiator be essentially free from bound water such as water of hydration.

It is most preferred that the reaction medium be a solvent for either the initiator or the monomer, and most preferably, for both. Where the reaction medium is a solvent for neither, the initiator is preferably used as a finely divided powder having a particle size in the range from about 5 microns to about 45 microns. When the reaction medium is a solvent for the initiator, it is preferred that the reaction medium be saturated with initiator. It is not essential that the initiator be highly soluble, and in most cases, the solubility is limited. By "soluble" I refer to initiators having a solubility in the range from about 5 to about 25 parts per hundred parts (pph) of solvent, a few initiators being more soluble. A solubility less than 5 pph is generally ineffective for the purpose of providing desirable speed of reaction.

Preferred initiators are the halides of iron, cobalt and nickel, preferably the fluoride, chlorides and bromides. Where stable iodides are used, the reactivity is generally not comparable to the chlorides and fluorides which are more preferred, for example ferric chloride, nickel chloride and cobalt chloride, and ferric fluoride, cobalt fluoride and nickel fluoride, all in the $+3$ state. Less preferred are cobalt bromide and nickel bromide.

The amount of the initiator used and its "freshness" generally controls the speed of the reaction and the molecular weight of the polymer, as is evidenced by the conductivity of the PP/subs PP formed. By "freshness" I refer to initiator which has not been aged, particularly by exposure to the atmosphere. If the initiator is essentially insoluble in the reaction medium, more initiator is generally required than if the initiator is soluble. Even when the initiator is soluble, it is preferably used in a major molar amount relative to the monomer, and preferably in the range from above 1 to about 20 moles of initiator to monomer, lesser ,amounts typically yielding a semiconductor polymer. Where the molar ratio of initiator to monomer is in the range from about 0.1 to about 1, and preferably from about 0.25 to 1, the polymer formed is a semiconductor. Where the molar ratio is in the range from 1 to about 20, and more preferably from 1 to about 10, the polymer formed is a conductor.

Unless the reaction medium used is a coordinating solvent, the particular solvent used is not narrowly critical except to the extent that it influences the properties of the polymer obtained, the extent of the influence usually being determined by simple trial and error such as one in this art would routinely expect to do.

A solvent in which there is no significant covalent bonding to the Group VIII metal of the initiator but nevertheless permits initiation of the polymer and its subsequent doping, is referred to herein as an "inert liquid" though it may have a solvating effect.

Liquids in which the initiator is poorly if at all soluble include the alkanes such as hexane, and cycloalkanes such as cyclohexane, all having from 4 to about 8 carbon atoms; aromatic liquids such as benzene, toluene and xylene; methoxy-xylene, nitro-xylene; halogenated aromatic liquids such as chlorobenzene, chlorotoluenes and chloroxylenes; hydrohalomethylenes particularly hydrochloromethylenes; chloroform perchloroethylene and carbon tetrachloride; sulfolane, 1,4-dioxane and dimethyl sulfone; and, lower primary alcohols having from 1 to about 6 carbon atoms; inter alia. Liquids in which the initiator is soluble include nitromethane and nitrobenzene; essentially unbranched dialkyl ethers having from 4 to about 20 carbon atoms, most peferably diethyl ether; propylene carbonate and N-methyl-2-pyrrolidone, and the like.

Coordinating solvents preferred in the process for forming the Group VIII metal-free polymer are the lower alkyl $(C_1-C_5)$nitriles, especially acetonitrile propionitrile and butronitrile. It is because of their coordination properties that such solvents essentially prevent the Group VIII metal ion from being associated with the conductive PP formed.

The polymerization reaction may be carried out at room temperature, but is preferably carried out at slightly elevated temperature in the range froma bout 20° C. to about 80° C. The pressure is not critical and is usually atmospheric though subatmospheric pressures and elevated pressures as high as about 20 atm may be used, if desired. Reaction pressure is typically autogenous and the reaction proceeds under an inert gas (nitrogen) blanket. The reaction time is most preferably very fast, in the order of about 0.5 sec to about 5 see, and is essentially instantaneous particularly when the polymer is deposited on a substrate such as paper.

The speed of the polymerization reaction where both the monomer and the initiator are in the liquid phase lends the reaction to a ready application to the impregnation of paper with conductive polymer in conventional paper making where a continuous sheet of paper is dipped first in monomer and then into an inert liquid containing initiator. All references to "monomer" herein refer to a pyrrole/subs pyrrole, and all those to "polymer" refer to PP/subs PP. Though porous substrates such as cellulosic and ceramic materials are preferred, semiconductors and conductors of this invention include any shaped article of ceramic or synthetic resinous material or any substrate which has been coated with polymer formed by the process of this invention.

Electrically non-conducting organic materials which may be made conductive include copolymers of butadiene with acrylic acid, alkyl acrylates or methacrylates, polyisoprene, polychloroprene, and the like; polyurethanes; vinyl polymers known as PVC resins such as polyvinyl chloride, copolymers of vinyl chloride with vinylidene chloride, copolymers of vinyl halide with butadiene, styrone, vinyl esters, and the like; polyamides such as those derived from the reaction of hexamethylene diamine with adipic or sebacic acid; epoxy resins such as those obtained from the condensation of epichlorohydrin with bisphenols, and the like; ABS resins, polystyrene, polyacrylonitrile, polymethacrylates, polycarbonates, varnish, phenol-formaldehyde resins, polyepoxides, polyesters, and polyolefin homo- and copolymers such as polyethylene, polypropylene, ethylene-propylene polymers, ethylene-propylenediene polymers, ethylene-vinyl acetate polymers, and the like.

Other organic insulators which can be made conductive include mixtures and blends of polymeric materials such as ABS resin blends, PVC and polymethacrylate blends, and blends of polyolefin homopolymers and copolymers such as blends of polypropylene in epdm polymers.

A compact of conductive PP/subs PP polymer may be used in an animal body as an implantable biosensor.

Inorganic insulating materials may also be made conductive or semiconductive. Such materials include fillers such as antimony oxide, aluminas, phosphates and the like, particularly those fillers used as fire retardants, and, insulating reinforcing materials such as glass spheres or fibers. Especially when the surface of glass fibers is treated, enough conductive polymer may be coated on the fibers so that when they are used to reinforce a shaped article of the synthetic resinous material, the article becomes conductive.

The procedure for applying the PP/subs PP polymer to a substrate is simple: A substrate to be coated is simply soaked in monomer and dipped in a solution/suspension (either of which is broadly referred to herein as a dispersion) of anhydrous initiator such as $FeCl_3$ in the reaction medium. Instantaneous polymerization occurs based on the oxidation-reduction potentials of the monomer/$FeCl_3$ system.

During polymerization, Fe and Cl are incorporated into the polymer as charged species, Fe being present in the range from about 3 to about 15% by wt of the polymer. If no charged species are present in the polymer, as is the case in neutral PP/subs PP formed particularly by electrodeposition, the polymer is an insulator.

Where Fe and Cl are present in combination as charged species in my polymer, the desired conductivity in the stated range may be imparted to the polymer or substrate to which it is applied by tailoring the parameters of the system, at all times, of course, using the anhydrous initiator. Where only Cl or Br as the counterion is desired, the concentration of the initiator and the temperature of the reaction affect the conductivity obtained, but it is essential that the initiator be anhydrous. The absence of water in the initiator is the parameter never heretofore recognized as being result-effective to give the particular properties of conductive polymers formed by this invention.

Quite surprising is that irrespective of the surface of the substrate, as long as it is essentially free of moisture, the polymer applied to the substrate is strongly adhered to it. The inertness of the polymer and its insolubility in commonly available solvents under acid or base conditions, ensures that the conductivity of the coated substrate will survive for a long period of time.

The amount of polymer deposited on the substrate may be controlled so that from about 0.001% to about 25% by wt of the substrate is polymer, in most instances from 0.1% to about 5% by wt being adequate to provide the desired conductivity.

Quite noteworthy is that when the substrate is first soaked in the dispersion, whether solution or suspension, of initiator in reaction medium, then dipped in pyrrole/subs pyrrole monomer, the formation of polymer is slower than when the order of the steps is interchanged, and the conductivity of the polymer is generally in the semiconductor range or lower. Thus, the conductivity of the polymer, or the substrate to which the polymer is applied, may be tailored by a choice of whether the monomer is added to liquid containing the initiator, or whether the liquid containing initiator is added to the monomer. Of course where the substrate is to be made highly conductive quickly, the substrate will be first coated with monomer and then dipped into liquid containing initiator for speed of reaction and higher conductivity; and, for a semiconductor, substrate is first coated with initiator, then dipped into monomer so as to have lower conductivity.

When the polymer is desired in a finely divided particulate form, monomer is simply poured into the dispersion of initiator. Again, as might be expected, the conductivity of the polymer as measured from a compact of the powder, will vary depending upon the process conditions particularly the ratio of initiator to monomer, the physical properties of the inert liquid, and the temperature at which the polymerization reaction takes place.

The invention is more fully described by the following illustrative examples.

EXAMPLE 1

Oxidative Polymerization of Pyrrole 19.6 g (0.12 mole) of fresh anhydrous $FeCl_3$ is dispersed in 300 ml of anhydrous diethyl ether in which some of the $FeCl_3$ is dissolved so as to form a saturated solution, while stirring under a $N_2$ atmosphere at 22° C. To this stirred saturated solution is added 2.1 ml (0.03 mole) of freshly distilled pyrrole in one portion. The reaction mixture instantly acquires a black color and a slight exotherm results. After allowing the reaction to proceed for 1 hr at 22° C. the black precipitate is filtered and washed with water, then with 50 ml of 10% HCl and again with water until the washings register about ph 7. It is essential that dilute HCl, preferably less than 20%, and not conc HCl, be used to preserve the charged species of Fe and Cl in combination. Finally, the black polymer is washed with ethanol and diethyl ether and dried for 4 hr in vacuo at 65° C. The product yield is 2.77 g.

A measurement of the DC four-point probe conductivity of the black powder gives a value of 46 S/cm at 22° C.

Elemental analysis (% by wt) of the PP product is made for C and H together in a modified Perkin Elmer 240 Analyzer as described in *The Microchemical Journal*, Vol 24, No 3, pg 300 et seq (September 1979). O is determined by a $CO_2$ coulometer as is conventionally done. N is measured by a modified Dumas system. Fe is determined by atomic absorption; and, Cl by the Schöniger oxygen flask combustion method. The analysis is as follows:

| Found (% by wt) |
| --- |
| C = 51.96 |
| H = 3.89 |
| N = 14.88 |
| Fe = 7.17 |
| Cl = 13.41 |
| O = 8.69 |

The oxygen in the forgoing analysis derives from the wash water trapped with the PP, which has a well known proclivity for O. Because the atomic ratio of Cl to Fe is closer to 3 than to 4, the calculated analysis (below) is based on $C_4H_3N(FeCl_3)_{0.12}.0.5H_2O$, the water being derived from washing, and is as follows:

| Calculated (% by wt) |
| --- |
| C = 51.35 |
| H = 4.32 |
| N = 14.98 |
| Fe = 7.16 |
| Cl = 13.64 |
| O = 8.55 |

EXAMPLE 2

Low Temperature Oxidative Polymerization of Pyrrole 39.2 g (0.242 mole) of fresh anhydrous $FeCl_3$ is dispersed in 600 ml of anhydrous diethyl ether in which some of the $FeCl_3$ is dissolved so as to form a saturated solution, while stirring under a N₂ atmosphere at 22° C. This solution is chilled to 0° C. and to this chilled and stirred saturated solution is added 4.2 ml (0.61 mole) of freshly distilled (from KOH) pyrrole, at 0° C., in a single portion. The reaction mixture instantly acquires a black color and reaches about 8° C. due to the exotherm. After allowing the reaction to proceed for 1 hr at 0° C. with stirring, the black precipitate is filtered and washed with distilled water, then with 100 ml of 10% HCl, until the washings register about pH 7. Finally, the black polymer is rinsed with ethanol and then diethyl ether and dried for 4 hr in vacuo at 65° C. The product yield is 4.77 g (dry wt).

A measurement of the DC four-point probe conductivity of the black powder gives a value of 90 S/cm at 22° C.

Because the atomic ratio of Cl to Fe is closer to 4 than to 3, the calculated analysis (below) is based on $C_4H_3N(FeCl_4)_{0.07} \cdot 0.4H_2O$, the water being derived from washing, and, the analysis made in a manner analogous to that described hereinabove is as follows:

| Found (% by wt) | Calculated (% by wt) |
| --- | --- |
| C = 56.11 | C = 55.78 |
| H = 3.85 | H = 4.46 |
| N = 15.95 | N = 16.27 |
| Fe = 4.37 | Fe = 4.54 |
| Cl = 12.44 | Cl = 11.53 |
| O = 6.94 | O = 7.43 |

EXAMPLE 3

Oxidative Polymerization of 3-methyl-4-hexyloxyphenyl Pyrrole

In a manner analogous to that described in example 1 hereinabove, 2.52 g (0.0155 mole) of fresh anhydrous FeCl₃ is dispersed in 30 ml of anhydrous diethyl ether at 22° C. under a N₂ atmosphere. 1.0 g (0.00388 mole) of 3-methyl-4-hexyloxyphenyl pyrrole is dissolved in 10 ml of anhydrous diethyl ether and this solution added to stirred FeCl₃ solution. The black polymer formed is worked up with washing in water and then dilute mineral acid to yield 0.65 g of product which is a black free-flowing powder. This powder is soluble in several organic solvents, particularly lower alkanos having from 1 to about 6 carbon atoms, and ethers having less than 20 carbon atoms. A measurement of the DC four-point probe conductivity of the powder gives a value of $8 \times 10^{-3}$ S/cm at 22° C.

Because the atomic ratio of Cl to Fe is closer to 4 than to 3, the calculated analysis (below) is based on $C_{17}H_{21}NO(FeCl_4)_{0.22} \cdot 0.4H_2O$, the water being derived from washing, and, the analysis made in a manner analogous to that described hereinabove is as follows:

| Found (% by wt) | Calculated (% by wt) |
| --- | --- |
| C = 65.81 | C = 66.70 |
| H = 6.85 | H = 7.19 |
| N = 4.71 | N = 4.58 |
| O = 7.39 | O = 7.32 |
| Fe = 4.37 | Fe = 4.54 |
| Cl = 12.44 | Cl = 11.53 |

The structure, confirmed by IR and NMR analysis, is as follows:

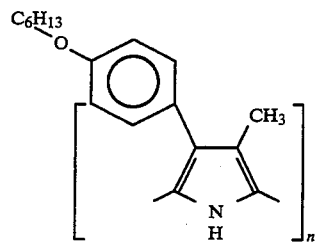

EXAMPLE 4

Oxidative Polymerization of 3-methyl-4-phenyl Pyrrole

In a manner analogous to that described in example 3 hereinabove, 4.15 g (0.026 mole) of fresh anhydrous FeCl₃ is dispersed in 50 ml of anhydrous diethyl ether at 22° C. under a N₂ atmosphere. This solution is chilled to 0° C. and to it is added 1.0 g (0.0064 mole) of 3-methyl-4-phenyl pyrrole dissolved in 14 ml of anhydrous diethyl ether which has been chilled to 0° C. The reaction mixture turns black and the temperature rises to about 6° C. The black polymer formed is worked up with washing in water and then dilute mineral acid (50 ml of 10% HCl solution) to yield, after drying, 1.1 g of product. This product is a solid particulate material which is soluble in organic solvents, particularly halocarbons such as dichloromethane, lower alkanols and ethers such as tetrahydrofuran. A measurement of the DC four-point probe conductivity of the powder gives a value of $4.3 \times 10^{-3}$ S/cm at 22° C.

Because the atomic ratio of Cl to Fe is about 3.8, the calculated analysis (below) is based on $C_{11}H_9N(FeCl_{3.8})_{0.11} \cdot 0.9H_2O$, the water being derived from washing, and, the analysis made in a manner analogous to that described hereinabove is as follows:

| Found (% by wt) | Calculated (% by wt) |
| --- | --- |
| C = 68.01 | C = 68.67 |
| H = 4.66 | H = 5.67 |
| N = 7.14 | N = 7.28 |
| O = 7.25 | O = 7.48 |
| Fe = 2.98 | Fe = 3.19 |
| Cl = 7.04 | Cl = 7.70 |

EXAMPLES 5-11

Effect of FeCl₃ conc. in the Reactor

In the following examples, the concentration of finely divided anhydrous FeCl₃ initiator in solution in diethyl ether anhydrous inert liquid medium is varied in the range from 1 to 8 moles of FeCl₃ per mole of pyrrole monomer, the volume of diethyl ether being held constant at 300 ml, without regard to the amount of initiator which goes into solution. Generally, the volume of inert liquid used is based on the volume of initiator used. Since, to make polymers having the desired range of conductivity, at least 0.1 mole of initiator per mole of monomer is used, at least an equal volume of initiator and inert liquid is necessary. A volume ratio of 100 (inert liquid to initiator) results in too slow a reaction, and a ratio less than 1 is impractical. Thus, since the reaction is carried out in a liquid medium, and the ratio of initiator to monomer is the prime determinative factor for the conductivity of the polymer formed, a preferred range for the volume ratio of inert liquid to initiator is from about 1:1 to about 100:1, more preferably about 5 to about 50, without regard to the amount of initiator which goes into solution. With 300 ml diethyl ether, a saturated solution of $FeCl_3$ is formed at a molar ratio of about 4, portion of the $FeCl_3$ being dispersed in the ether at higher ratios. All polymerizations in Table I hereinbelow are carried out at 22° C., and DC, four-point probe conductivities are measured at 22° C.

TABLE I

| Ex. No. | mole ratio $FeCl_3$/pyrrole | conductivity S/cm |
|---|---|---|
| 5 | 0.5 | $1 \times 10^{-3}$ |
| 6 | 1 | 1 |
| 7 | 2 | 5 |
| 8 | 3 | 20 |
| 9 | 4 | 40 |
| 10 | 4* | 90 |
| 11 | 8 | 34 |

*polymerization carried out at 0° C.

As will be evident from the foregoing Table I, a molar ratio greater than 4 appears to yield a reaction product having about the same conductivity as that obtained with a ratio of 4, at 22° C., but the conductivity is increased when the reaction is carried out at 0° C.

EXAMPLES 12–19

Effect of Time of Polymerization Reaction on Conductivity of Polymer

The following results are particularly noteworthy because known conjugated conductive polymers exhibit an increased level of electrical conductivity when the time of exposure to the oxidant (dopant) is increased. In the following series of experiments, the inert liquid medium was diethyl ether and its volume in each case was 300 ml though the ratio of $FeCl_3$ to pyrrole was varied in the range from 4:1 to 1:1. DC four-point probe conductivity measurements in the following Table II were carried out on pressed powder discs at 22° C.

TABLE II

| Ex. No. | mole ratio $FeCl_3$/pyrrole | reaction time (hr) | conductivity S/cm |
|---|---|---|---|
| 12 | 4 | 66 | 0.05–0.3 |
| 13 | 4 | 4 | 5.9 |
| 14 | 4 | 1 | 42 |
| 15 | 3 | 48 | 0.05 |
| 16 | 3 | 1 | 16 |
| 17 | 2 | 68 | 0.005 |
| 18 | 1 | 70 | −0.014 |
| 19 | 1 | 1 | 2.6 |

EXAMPLE 20

Insulator Substrates Made Conductive

A. A strip of filter paper (Whatman #4) is soaked in anhydrous pyrrole and the excess wiped off. The pyrrole-soaked paper is dipped in a dispersion of 45 g of $FeCl_3$ in 300 ml diethyl ether and immediately withdrawn. The paper instantaneously acquires the black color characteristic of PP. After washing with water, methanol and ether, the paper substrate coated with the polymer is allowed to dry for 1 hr and the conductivity measured at 22° C. as in the previous examples. The value obtained is 10 S/cm.

B. In a manner analogous to that described immediately hereinabove, a strip of Geon® 103 EP poly(vinyl chloride) (PVC) film 6 mils thick, which is commercially available, is soaked in anhydrous pyrrole for 30 min. The pyrrole-soaked PVC film is wiped to remove excess pyrrole and dipped into saturated initiator solution such as is used in 20A. As before, the film instantly acquires a balck color indicating the substrate has been coated with PP. The film is withdrawn, washed with water, methanol and ether and allowed to dry for 1 hr. The conductivity obtained was 1.38 S/cm.

In an analogous manner, materials such as glass fibers which are insulators at ambient temperatures may be made conductive or semiconductive, as desired. Though this process lends itself particularly well to applying conductive PP/subs PP to laminar articles, they may be of arbitrary shape, and it is not critical how the pyrrole is applied to the article, or whether the pyrrole-coated article is dipped into the initiator solution. For example, either one, or both the pyrrole and the initiator solution may be sprayed onto the substrate before polymerization.

EXAMPLE 21

Conductive Fillers (Reinforcing) for Masking Filled (Reinforced) Polymers

A. 30 g of antimony oxide ($Sb_2O_3$) flour having a primary particle size in the range from about 1–5 microns is soaked in pyrrole, the excess pyrrole centrifuged off, and the pyrrole coated flour stirred into saturated initiator solution such as was used in 20A. Soon thereafter the solution is filtered, and the black powder obtained is worked up as before by washing, and dried. 20 g of the coated flour are milled with 100 g of PVC and extruded into a thin sheet 6 mils thick. The sheet is conductive (about 5 S/cm) and the flame retarding characteristics of the flour are maintained.

B. 20 g of $Sb_2O_3$ flour are milled into 100 g of PVC and extruded into a film 6 mils thick. The filled film is then treated as described in example 20B hereinabove. The conductivity obtained is about 4 S/cm.

C. 40 g of alumina trihydrate having a primary particle size in the range from about 1–45 microns is soaked in pyrrole as described in 21A hereinabove, the excess pyrrole removed, and the coated powder is stirred into initiator solution, filtered and dried. 20 g of the alumina trihydrate coated with PP are milled into PVC and extruded into 6 mil thick film. The film obtained has a conductivity of about 4 S/cm and the flame retarding qualities of the alumina trihydrate are retained.

D. 20 g of alumina trihydrate powder are milled into 100 g of PVC and extruded into 6 mil thick film. The filled film is then treated as described in example 20A hereinabove. The conductivity obtained is about 5 S/cm.

In the foregoing examples 21C and D, the presence of water chemically bound in the alumina trihydrate does not appear to affect the effectiveness of the process because the water is not available for removal by the anhydrous inert liquid medium.

Glass or other fibers made from refractory ceramic materials may analogously be first coated with PP and then used for reinforcing polymer, or, the fibers may first be incorporated in the polymer to reinforce it, then the reinforced polymer is coated with PP, though it will be appreciated the conductivities obtained in each case win be different.

From the data presented in Table I it is evident that conductivity is increased at lower polymerization temperatures, but the rate of polymerization decreases. The polymerization may be carried out at any temperature above the freezing point of the inert liquid, but in practice, a temperature in the range from about $-50°$ C. to about $35°$ C., more preferably from $-20°$ C. to $30°$ C., is preferred.

It will also be evident that the conductivity of PVC is substantially the same whether the conductive powder fillers are milled into the PVC before it is extruded; or, the PVC is milled with insulating powder, extruded, and then coated with PP. Much greater differences in conductivity are obtained with substrates which are coated with pyrrole first, then dipped into the initiator solution, and vice versa.

EXAMPLE 22

Preparation of PP+Cl⁻(Polypyrrole Chloride) in Acetonitrile 300 ml anhydrous $FeCl_3$ and 300 ml of dry acetonitrile are stirred at reflux for 1 hr under a $N_2$ blanket. The dark brown-red mix is cooled to room temperature. 2.1 ml of pyrrole freshly distilled over KOH is now added in a single portion. The mix turns black instantly and an exotherm to $27°$ C. is noted. The reaction is continued for 1 hr at ambient conditions under $N_2$ and protected from light. The reaction mixture is filtered, and the black precipitate is washed with copious amounts of water until neutral to pH paper, then rinsed with ethanol, then ether. The precipitate is then dried under vacuum at $65°$ C. and weighed. 1.15 g is recovered. The conductivity of the precipitate when compacted is about 0.27 S/cm.

The following results are obtained upon analysis:

| Found (% by wt.) | Structure: |
|---|---|
| C = 56.57 | |
| H = 4.15 | |
| N = 15.67 | 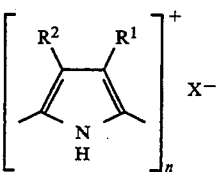 |
| Cl = 14.08 | |
| Fe = 0.32 (negligible) | |
| O = 9.21 | |
| | $R^1$ and $R^2$ are each H |
| | X represents chlorine |

The foregoing corresponds to the empirical formula $C_{4.2}H_{3.67}N_{1.0}O_{0.53}Cl_{0.35}$

EXAMPLE 23

Preparation of PP in Aqueous Acid

| Reagents: Pyrrole (distilled over KOH) | = 2.1 ml |
|---|---|
| $FeCl_3 \cdot 6H_2O$ | 10.0 g |
| 0.01 M HCl | 100 ml |

When the 0.01M HCl solution is stirred with the $FeCl_3 \cdot 6H_2O$ added to it, a brown solution results at room temperature under $N_2$. To this solution is added all the pyrrole. The mixture turns black instantly and the temperature rises to $28°$ C. The reaction is continued for 1 hr at ambient conditions under $N_2$ while being protected from light. The mixture is then filtered, the black precipitate is washed with water, then rinsed with ethanol, and finally with ether. The precipitate is then dried under vacuum at $65°$ C. The yield of precipitate is 1.12 g. The conductivity of a compact of the polymer is found to be about 16 S/cm.

Compared to an analogous reaction carried out in anhydrous diethyl ether with anhydrous $FeCl_3$, the yield under anhydrous conditions is about 60% better, and the conductivity is about 70% better.

EXAMPLE 24

Preparation of PP with Anhydrous and Hydrated $FeCl_3$ for Comparison

A. 32.7 g of $FeCl_3 \cdot 6H_2O$ (0.12 mol $FeCl_3$) is weighed into a reactor under a $N_2$ blanket, 300 ml ether is added (under $N_2$) and the mix stirred for 30 min while the mixture is protected from light. 2.1 ml of pyrrole is dumped into the reactor and the reaction continued for 1 hr at ambient temperature. Thereafter the black reaction mixture is filtered with difficulty. Addition of HCl, and allowing it to stand overnight, facilitates filtration. The precipitate obtained is washed well with water, then with ethanol and finally with ether before it is dried in vacuum at $65°$ C. 0.65 g precipitate is recovered. The conductivity of a compact of the precipitate is about 0.1 S/cm.

B. In an analogous manner to that described immediately hereinabove, 2.1 ml of pyrrole in anhydrous diethyl ether containing 0.12 mol anhydrous $FeCl_3$ are reacted, and the precipitate recovered by washing and filtering, as described. The amount of precipitate recovered is 2.8 g. The conductivity of a compact of the precipitate is 50 S/cm.

A comparison indicates that the yield with hydrated $FeCl_3$ is much lower (4 times worse), as is the conductivity (500 times less).

EXAMPLE 25

Preparation of PP in Presence of Aqueous HCl Acid 19.6 g of $FeCl_3$ are stirred into 300 ml of water to which 15 ml of conc HCl are added. The solution temperature rises to about $35°$ C. and the pyrrole is added in a single portion. The mixture turns black instantly, and the reaction is continued for 1 hr at ambient conditions under $N_2$ and protected from light. After 1 hr a black precipitate is recovered which is rinsed with 10% HCl, washed with water, then rinsed sequentially with ethanol and ether. After drying at $65°$ C. under vacuum 2.84 g of ppte is recovered. A compact of the polymer has a conductivity of 7 S/cm which is lower than that obtained under acid-free anhydrous conditions.

It will be evident that the charges depicted on the conductive PP/subs PP are not quantitative. The counterions when the Group VIII metal is Fe may be $FeCl_4^-$, $FeCl_4(2^-)$ or $FeCl_6(3^-)$.

EXAMPLE 26

Preparation of Conductive Porous High Density Polyethylene ("PE")

Though the anhydrous initiator may be deployed in a wide assortment of anhydrous liquid media which are inert relative to the initiator, the di(lower alkyl) ethers, for example diethyl ether is used herein because it is easily available and convenient to use.

A porous polyolefin article of arbitrary shape, for example a piece of porous high density PE sheet (from Porex Technologies), is an insulating material having essentially infinite surface resistivity, at least a conductivity of less than $10^{-10}$ S/cm. A small 1.25″ (inch)

square sheet of the PE weighing 1.04 g and having a thickness of 0.065" with a pore size of 70 microns, was soaked in 8 ml of pyrrole for 1 hour at 22° C. The excess pyrrole was wiped off and the porous PE was found to have absorbed 0.918 g of pyrrole. The pyrrole-impregnated PE was then suspended in a solution containing 9.8 g of anhydrous $FeCl_3$ in 150 ml of diethyl ether. The pyrrole impregnated PE acquired a black color characteristic of PP formation. After 1 hour of immersion, the black, PP-coated PE was removed from the $FeCl_3$/ether solution and it was washed with water and rinsed with ethanol and ether. After vacuum drying at 65° C., the PP-coated PE was found to weigh 1.08 g.

The surface resistivity of the coated sample was found to be 360 ohms/square for a sample thickness of 0.066". Note that the pyrrole-impregnated PE gained only 4% in weight, and increased only 1.5% in thickness as a result of the impregnation process. Thus, the porous PE has essentially retained its original dimensions and weight while acquiring substantial conductivity. The porous PP-coated PE is used as a separation membrane, filter or sensor.

EXAMPLE 27

Preparation of Conductive Poly(Vinyl Chloride) ("PVC") Molding Resin 8.62 g of commercially available Geon ® PVC having an average particle size of 120 microns and a porosity of 0.25-0.33 cc/g DOP, are soaked in liquid pyrrole for 30 min at 22° C. The excess pyrrole liquid is filtered off under suction, and the PVC resin is found to have absorbed 8.654 g of pyrrole monomer. A 2 g sample of this pyrrole-impregnated PVC resin is then added in a single portion to a solution of 9.8 g of anhydrous $FeCl_3$ in 150 ml of diethyl ether. The pyrrole-impregnated PVC resin instantaneously acquires the black color characteristic of PP. After stirring the reaction mixture for 1 hr at 22° C. under nitrogen, the solution is filtered off and the black PP-coated PVC resin is washed with water, 10% HCl, water, ethanol and ether, in that order, and dried in vacuo for 1 hr at 65° C. Conductivity is measured with a DC four-point probe at 22° C. on a compacted disc of the PP-coated resin granules. The value obtained is 22 S/cm.

EXAMPLE 28

Preparation of Conductive Zeolite Particles 2.0 ml of liquid pyrrole were added in a single portion to a stirred suspension of 2.0 g of zeolite (ZLD 1000, Union Carbide) in 150 ml of diethyl ether. This mixture was allowed to stir at 22° C. under nitrogen for 36 hr to allow complete sorption (absorption and adsorption) of the pyrrole monomer into and onto the porous zeolite. 19.6 g of anhydrous $FeCl_3$ were then added to the reaction mixture. The zeolite material instantly acquired the black color characteristic of PP formation. The mixture was filtered and the black, PP-impregnated and coated zeolite was washed extensively with water, ethanol and ether, in that order. The product was vacuum-dried at 65° C. to give 3.3 g of PP-impregnated zeolite.

Conductivity measured with a DC four-point probe is $1.62 \times 10^{-2}$ S/cm at 22° C., as compared with a value of less than $10^{-6}$ S/cm for the as-received, uncoated zeolite.

The foregoing PP-coated zeolite is used as a catalyst and/or catalyst-support for electrocatalytic reactions, and as an ion-exchange material.

EXAMPLE 29

Preparation of an Optical Storage Device

A chemically synthesized PP film may be used to produce "write-once" optical data storage devices. An optically flat substrate, for example a smooth PVC disc, is contacted with a solution of an oxidant/polymerization initiator by dipping, spraying, brushing or otherwise coating the solution onto the disc. The preferred oxidant/initiator is anhydrous $FeCl_3$/diethyl ether. The coated disc is exposed to pyrrole vapor resulting in instantaneous formation of a black coating of PP on the disc. Spectroscopic analysis of the black PP film indicates a high degree of absorption across the ultraviolet-visible-infrared region, that is, from 200-2000 nanometers. A laser beam from any of various laser sources for example, argon, helium-neon, or diode, of sufficient power, may be used to record (write) information onto the PP-coated disc. The laser beam, when directed onto the black surface, converts the PP film to a highly reflective spot. As a result, a high degree of spectral contrast is provided by virtue of the highly absorbing surface of the non-exposed PP film and the highly reflective laser beam-exposed spots. The exposed disc, now inscribed with the information written with the laser beam, can then be read using a low power laser, in a conventional manner.

The foregoing process has several advanatges compared with one described in a recent journal article relating to an information storage device based on electrochemically synthesized PP film (see "Polypyrrole for Use in Information Storage" by W. H. Meyer, *Synthetic Metals,* 10, 255-259, 1985). For example, the electrochemical synthesis of PP requires long reaction times (90 min or more), is energy intensive, and the PP film dimensions are limited to the size/shape of the electrode utilized in the electrochemical cell. In addition, the electrochemically prepared PP film must subsequently be laminated (by gluing or hot-pressing) onto the substrate, thereby making the information storage device so formed highly susceptible to failure as a result of likely delamination.

In contrast, my one-step process for making a PP-film coated optical disc is characterized by essentially instantaneous formation of the PP film. Since the PP is grown directly onto the substrate, a separate lamination step is avoided as is the risk of delamination. My process is amenable to deposition of PP onto any substrate of arbitrary size and shape as long as it does not interfere with the formation of the PP; the process is not energy intensive, and is well-adapted for mass production of optical storage devices.

EXAMPLE 30

Metallization of Polyprrole-Impregnated Filter Paper

A piece of filter paper (Whatman #2) was made conductive by impregnating it with PP as described in Example 20A above, then immersed in a solution containing 2.0 g $AgNO_3$, 3 ml of 28% $NH_4OH$ and 50 ml water at 22° C. To the above solution was added 3.5 ml of 37% formaldehyde in 50 ml water. The black PP-coated filter paper instantaneously acquired a silver sheen as a layer of elemental silver was deposited on the paper. The conductivity of the paper was essentially that of silver, that is about $10^6$ S/cm.

EXAMPLE 31

PP-impregnated Filter Paper used as a Sensor

A piece of 200 ohms/square PP-impregnated filter paper, prepared according to the procedure described in example 20A hereinabove, is exposed to flowing HCl gas for 30 min, after which it has a surface resistivity of 120 ohms/square.

In an analogous manner, a 125 ohms/square piece of PP-impregnated filter paper after being exposed to gaseous ammonia for 30 min, has a surface resistivity of 2,500 ohms/square.

The foregoing are each examples of a PP-impregnate substrate undergoing a change in surface resistivity when contacted with various chemical agents. The magnitude and direction of the the change in surface resistivity, whether to greater or lesser conductivity, is a characteristic of the chemical agent which can therefore be detected by exposure to the PP-impregnated substrate.

From the foregoing examples it will be evident that the chemical oxidative polymerization of pyrrole to impregnate or otherwise coat an insulating substrate to convert it to a conductive one, allows one to convert large and/or complex parts of arbitrary shape which retain their mechanical properties. In other words, they are converted to semiconductors or conductors without affecting the physical properties of the substrate. This is is marked contrast to electrochemical polymerization of PP which requires the use of a conductive substrate (electrode) and the shape and size of the article to be coated is limited by the dimensions of the electrode which can be used in the electrochemical process.

A teaching of the electrochemical process is found in U.S. Pat. No. 4,582,575 to Warren et al (class 204/subclass 12) in which an electrically conducting composite is formed by tightly overlaying a dielectric porous substance on an anode in an electrolytic cell containing pyrrole monomer and a non-nucleophilic anion. Examples of such anions are bisulfate anions derived from sulfuric acid or sodium bisulfate. After electrolysis, the polymer impregnated insulating material is peeled from the anode.

It was thereafter, and much later, discovered that the electrochemical process had unacceptable limitations, and a non-electrochemical process was disclosed in U.S. Pat. No. 4,696,835 to Maus et al (class 427/subclass 121). In this '835 process, the dielectric substrate is contacted with a strong oxidant capable of oxidizing the pyrrole monomer to PP; the substrate is then dried and exposed to vapors of pyrrole which are converted in the presence of a non-nucleophilic anion into PP which is deposited on the substrate.

In U.S. Pat. No. 4,697,000 to Witcuki et al (Class528-/subclass 423) there is claimed a process for producing electrically conducting pyrrole powder by treating liquid pyrrole with a solution of a strong oxidant which is a cation and oxidizing the pyrrole with this cation in the presence of a non-nucleophilic anion. Cations identified are $Fe^{3+}$, $Cu^{2+}$, $Ce^{+}$, $NO^{+}$, $NO_2^{+}$ and $(C_6H_5)_3C^{+}$ which appear to be effective both in the presence of water, and when no water is stated to be present. No mention is made as to the effect of the presence of water, nor is there any mention of the formation of a metal-containing anion in an organic anhydrous solvent, which anion would not likely be non-nucleophilic. In U.S. Pat. No. 4,697,001 to Walker et al (class 528/subclass 423) the conductive pyrrole was produced with the foregoing cations but using a large organic anion (referred to as an oxidant counterion). Such anions are identified as being alkyl and aryl sulfonates and fluorinated carboxylates. For example, ferric ethylbenzenesulfonate in aqueous solution is used; in another, the reaction was carried out in methanol. To impregnate a substrate, a two-step procedure is used: first, the substrate is wetted with a solution of ferric ethylbenzenesulfonate in acetone; in the second step the wetted substrate is dipped into a solution of pyrrole in pentane.

General Applications for PP-coated/impregnated substrates which were Insulators:

1. antistatic packaging and EMI shielding;
2. coating fibers to produce conductive composites for aerospace applications, for example, to be used in protection of aircraft from damage due to being struck by lightning; and, masking aircraft against detection by radar;
3. chemical sensors, because the conductivity of PP changes upon exposure to different chemicals;
4. electrically conductive membranes for use in separation processes and for controlled release drugs;
5. electrocatalysis/photocatalysis;
6. Schottky barriers;
7. electroless plating;
8. patterned electrodes;
9. high-density information storage devices;
10. built-in heating devices such as heated automobile seats, and de-icers for aircraft wings;
11. lightweight, flexible batteries;
12. providing flame-retardant fillers, reinforcing fibers and structures containing them with electrical conductivity by virtue of the conductivity of the fillers and fibers coated with the conductive PP.

Having thus provided a general discussion, and specific illustrations of the best mode of my invention, it is to be understood that no undue restrictions are to be imposed by reason thereof except as provided by the following claims.

I claim:

1. A process for converting an electrically insulating substrate having a conductivity less than $10^{-6}$ $ohm^{-1}cm^{-1}$ ("S/cm") into a conductive one having a conductivity of greater than about $10^{-3}$ S/cm, comprising, applying to said substrate a deposit of a pyrrole/-substituted pyrrole polymer ("PP/subs PP") linked through N-adjacent carbon atoms of the pyrrole nucleus, said polymer being represented by the structure

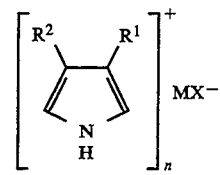

wherein, n is an integer in the range from about 2 to about 100;

M represents a Group VIII metal selected from the group consisting of iron, nickel and cobalt;

X represents chlorine or bromine;

$R^1$ is selected from the group consisting of hydrogen, alkyl having from 1 to about 6 carbon atoms, cycloalkyl having from 3 to about 7 ring carbon atoms one or more of which may be substituted, alkoxyalkyl having from 3 to about 24 carbon atoms, benzyl, and benzyl which is ring-substituted with halogen or lower alkyl having from 1 to about 6 carbon atoms;

R² is selected from the group consisting of hydrogen, hydroxyphenyl, hydroxyphenyl which is ring-substituted, and an acyclic ether selected from the group consisting of (i) alkoxy represented by —OR³, wherein R³ represents alkyl having from 1 to about 12 carbon atoms, alkoxyalkyl having from 2 to about 24 carbon atoms, phenyl or substituted phenyl, benzyl or substituted benzyl, heteroaryl or substituted heteroaryl; (ii) polyalkoxy represented by the structure $CH_3$—$OCH_2CH_2]_{n'}$ wherein n' is an integer in the range from 1 to about 20; and (iii) $R^4$—O—$R^5$ wherein either $R^4$ or $R^5$ is a linking group selected from phenyl and benzyl, each of which may be substituted, alkyl having from 1 to about 24 carbon atoms, and cycloalkyl having from 3 to about 7 ring carbon atoms one or more of which may be substituted; and, R¹ may be substituted with R², and if so substituted, each R² substituent may be the same or different; said polymer formed by (a) dispersing an anhydrous polymerization initiator selected from the group consisting of halides of a Group VIII metal selected from iron, cobalt and nickel in an anhydrous liquid reaction medium so as to form a dispersion of said initiator in said medium, and, (b) adding anhydrous essentially pure liquid pyrrole/substituted pyrrole monomer which is soluble in said reaction medium, to said dispersion at a temperature in the range from above the freezing point of said reaction medium to below its boiling point, whereby said PP/subs PP formed contains an ion selected from the group consisting of said Group VIII metal, halogen, and combinations thereof present as charged species, and has a conductivity in the range from about $10^{-3}$ to about 150 S/cm.

2. The process of claim 1 wherein said insulating substrate is selected from a cellulosic material and a solid inorganic filler material.

3. The process of claim 2 wherein said cellulosic material is papers, and said inorganic filler material is selected from fire retardants, and reinforcing materials.

4. The process of claim 3 wherein said fire retardants and reinforcing materials include antimony oxide, alumina trihydrate, aluminas, phosphates, glass spheres, glass fibers and refractory ceramic fibers which optionally are included in a synthetic resinous material.

5. The process of claim 1 wherein said substrate is porous.

6. A process for converting an electrically insulating porous substrate having a conductivity less than $10^{-6}$ohm$^{-1}$cm$^{-1}$("S/cm") into a conductive one having a conductivity greater than about $10^{-3}$ S/cm, comprising, applying to said porous substrate a deposit of a pyrrole polymer ("PP")/substituted pyrrole polymer ("subsPP") linked through N-adjacent carbon atoms of the pyrrole nucleus, said polymer being represented by the structure

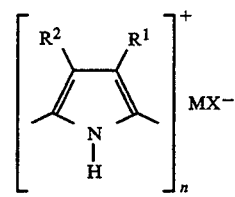

wherein, n is an integer in the range from about 2 to about 100;

M represents a Group VIII metal selected from the group consisting of iron, nickel and cobalt;

X represents chlorine or bromine;

R¹ is selected from the group consisting of hydrogen, alkyl having from 1 to about 6 carbon atoms, cycloalkyl having from 3 to about 7 ring carbon atoms one or more of which may be substituted, alkoxyalkyl having from 3 to about 24 carbon atoms, benzyl, and benzyl which is ring-substituted with halogen or lower alkyl having from 1 to about 6 carbon atoms;

R² is selected from the group consisting of hydrogen, hydroxyphenyl, hydroxyphenyl which is ring substituted, and an acyclic ether selected from the group consisting of (i) alkoxy represented by —OR³, wherein R³ represents alkyl having from 1 to about 12 carbon atoms, alkoxyalkyl having from 2 to about 24 carbon atoms, phenyl or substituted phenyl, benzyl or substituted benzyl, heteroaryl, or substituted heteroaryl; (ii) polyalkoxy represented by the structure $CH_3$—$[OCH_2CH_2]_{n'}$ wherein n' is an integer in the range from 1 top about 20; and (iii) $R^4$—O—$R^5$ wherein either $R^4$ or $R^5$ is a linking group selected from phenyl and benzyl, each of which may be substituted, alkyl having from 3 to about 7 ring carbon atoms one or more of which may be substituted; and, R¹ may be substituted with R², and if so substituted, each R² substituent may be the same or different;

said polymer formed by (a) contacting said electrically insulating porous substance with a liquid, anhydrous, essentially pure liquid pyrrole/substituted pyrrole monomer, (b) contacting said porous substance with a solution of an anhydrous anhydrous polymerization initiator, selected from the group consisting of halides of a Group VIII metal selected from iron, cobalt and nickel, in an anhydrous organic liquid reaction medium, and, (c) polymerizing said pyrrole monomer to form conductive polymer containing an ion selected from the group consisting of said Group VIII metal, halogen, and combinations thereof present as charged species, and having a conductivity in the range from about $10^{-3}$ to about 150 ohm$^{-1}$cm$^{-1}$ ("S/cm").

* * * * *